United States Patent [19]
Takahashi et al.

[11] Patent Number: 5,493,331
[45] Date of Patent: Feb. 20, 1996

[54] APPARATUS FOR JUDGING THE ORDER OF ARRIVAL OF RACERS AT A GOAL IN A RACE AND THE TIME TAKEN FOR THE RACE, USING COLOR IMAGE PICKUP

[75] Inventors: Yuji Takahashi, Kokubunji; Naoyuki Shimbo, Urawa, both of Japan

[73] Assignee: Hitachi Denshi Kabushiki Kaisha, Tokyo, Japan

[21] Appl. No.: 215,731

[22] Filed: Mar. 22, 1994

[30] Foreign Application Priority Data

Mar. 22, 1993 [JP] Japan .................................. 5-086714

[51] Int. Cl.[6] .................................................. H04N 7/18
[52] U.S. Cl. ............................................ 348/157; 358/514
[58] Field of Search ............................ 348/157; 358/514; H04N 7/18

[56] References Cited

U.S. PATENT DOCUMENTS

| | | | |
|---|---|---|---|
| 3,678,189 | 7/1972 | Oswald | 348/157 |
| 3,890,463 | 6/1975 | Ikegami | 348/157 |
| 5,136,283 | 8/1992 | Nobs | 348/157 |
| 5,329,384 | 7/1994 | Setani | 358/514 |

Primary Examiner—Howard W. Britton
Attorney, Agent, or Firm—Antonelli, Terry, Stout & Kraus

[57] ABSTRACT

An apparatus for judging the order and time of arrival of moving objects such as racers at a judgement criterion line such as a goal line in a race, using color image pickup. A camera which includes a color linear image sensor which in turn includes G, B and R or complementary color filters and a one-dimensional array of a plurality of opto-electric conversion elements picks up the images of the moving objects which pass the judgement criterion line to produce Y, Pb, Pr signals or G, B, R color signals, records those signals successively into a memory of an image processor, selects a desired image through a controller, reads the memory, and displays the obtained data on a color video monitor to accurately discriminate the respective racers.

20 Claims, 9 Drawing Sheets

F I G. 11
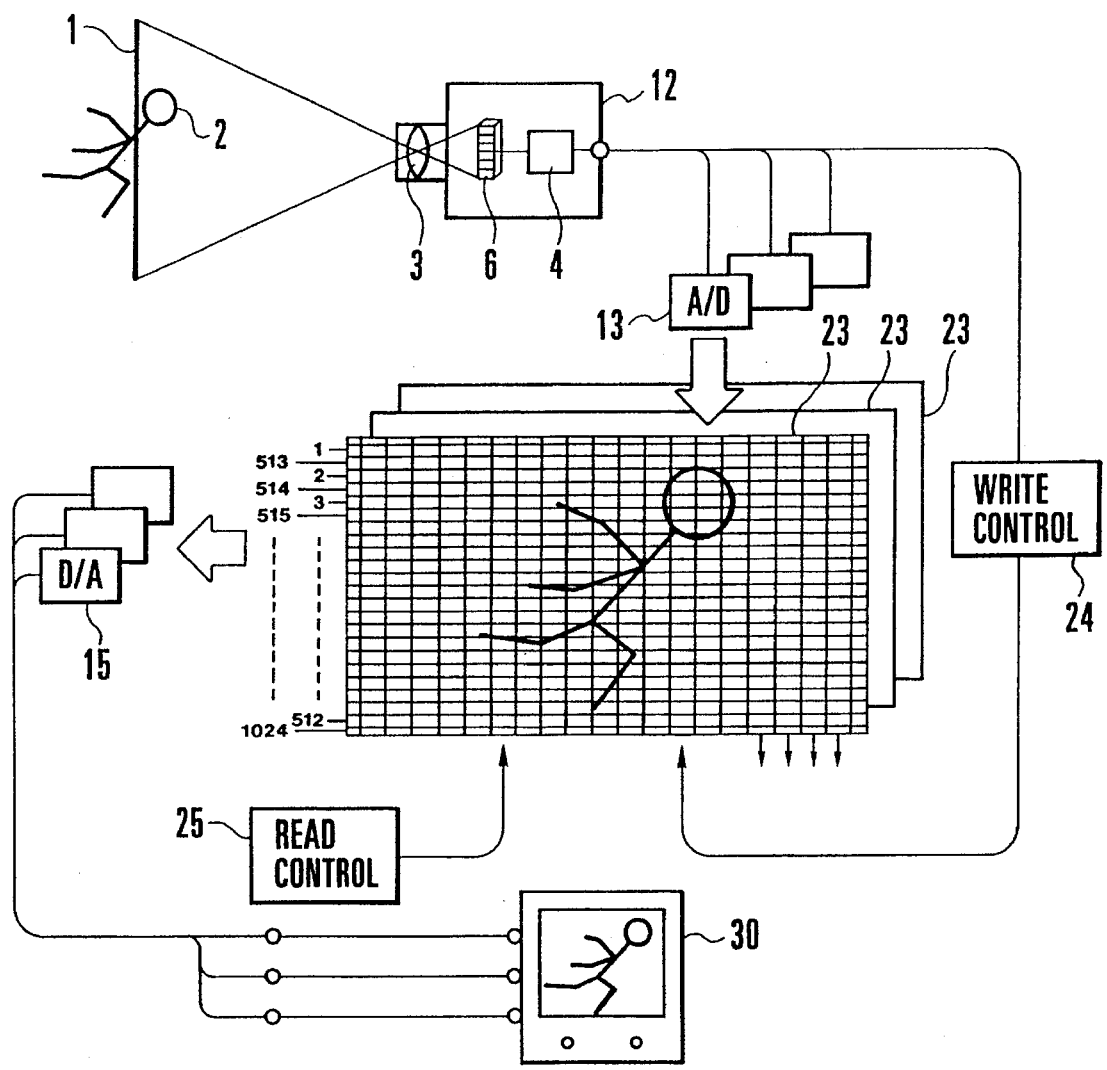
F I G. 12
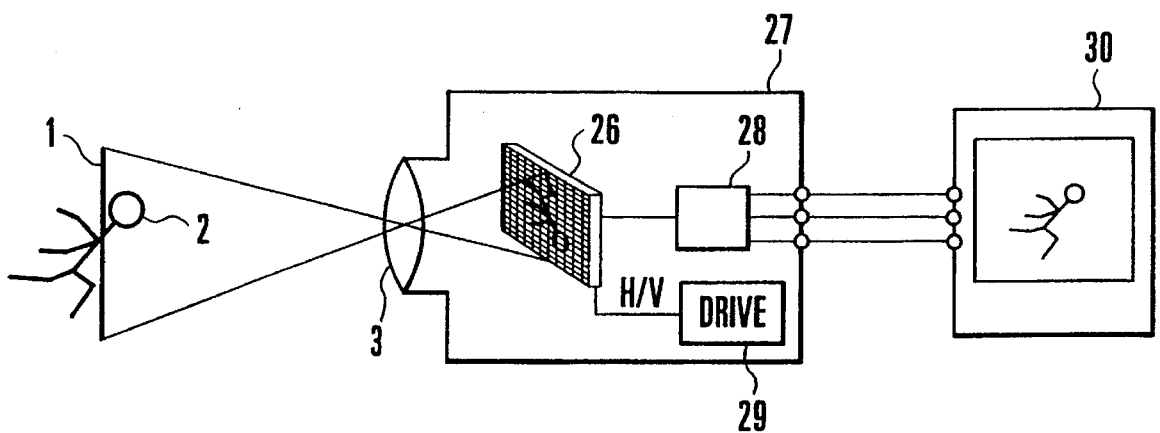

APPARATUS FOR JUDGING THE ORDER OF ARRIVAL OF RACERS AT A GOAL IN A RACE AND THE TIME TAKEN FOR THE RACE, USING COLOR IMAGE PICKUP

BACKGROUND OF THE INVENTION

The present invention relates to an apparatus for judging the order of arrival of high speed moving objects at a goal line in a speedboat race, horse race, bicycle race, athletic sports or the like and the time taken in the race, using color image pickup.

Conventional techniques of this type are a judging apparatus disclosed, for example, in U.S. Pat. No. 4,797,751 and JP-B2-55-24831, and its improved technique which is an "electronic immediately judging apparatus" disclosed in Unexamined Japanese Patent Publication JP-A-3-139374, etc.

Those devices use a linear image sensor camera which picks up the image of an object, which passes a judging criterion line such as a goal line, at the criterion line, inputs the output of the camera to a scan converter and displays the resulting signal from the converter on an image monitor.

Those conventional techniques judge the order of arrival of objects at a goal line, using a monochromatic image. For example, in the case of judgment of the order of arrival of racers at a goal line in athletic sports, racers are distinguished by their numbers on a display screen in regular judgement using those devices or by a report from a judge in, or near, a course along which racers run.

In an actual race, racers' dress is colorful. Although the racers are separated by cap or dress color, they cannot be separated by color information in the case of a monochromatic image. If contrast is the same, they cannot be distinguished from each other at all as the case may be.

Thus, the conventional devices have the drawbacks that racers who are close to, or overlap with, each other in the vicinity of the goal line are difficult to discriminate, or that the racers' numbers are difficult to distinguish from each other.

SUMMARY OF THE INVENTION

It is an object of the present invention to provide an apparatus for judging the order of arrival of racers at a goal in a race and their time taken for the race, using color image pickup, and which is capable of discriminating the racers accurately from each other and is free from wrong judgement.

It is another object of the present invention to provide an apparatus using color image pickup, in which the volume of a memory storing color image can be made small.

In order to achieve the above object, the inventive apparatus includes a linear sensor camera using a color linear image sensor, an image processor, an operating unit, a signal converter and a color high-resolution monitor to focus the images of moving objects such as racers who pass over a judgement criterion line such as a goal line onto the color linear image sensor, to extract a signal from the sensor as data on the color image into a memory of the image processor, to reproduce the image to be judged on the display screen of the color high-resolution monitor to rapidly and accurately judge the order of arrival of the racers at the goal line and measure the race time with conventional monochromatic information and newly added color image information.

Alternatively, according to the present invention, in place of the color linear image sensor, a half mirror or a spectroscopic prism, a color linear sensor and a monochromatic linear sensor may be used to focus an image obtained by the half mirror or the spectroscopic prism onto the respective sensors, and to scan the image at a predetermined scan period to thereby obtain a color image signal.

Alternatively, according to the present invention, in place of the color linear image sensor, an optical color decomposition system and three monochromatic linear sensors may be used to focus three primary color (green, blue, red) images to which the original image is decomposed by the optical color decomposition system onto the three monochromatic linear monochromatic sensors, and to scan the sensors at a predetermined scan period to thereby obtain a color image signal.

BRIEF DESCRIPTION OF THE DRAWINGS

FIG. 11 illustrates a scan frequency conversion process performed in the present invention.

FIG. 12 illustrates the structure of a television camera using a two-dimensional area sensor.

DESCRIPTION OF THE PREFERRED EMBODIMENTS

Figure 1:
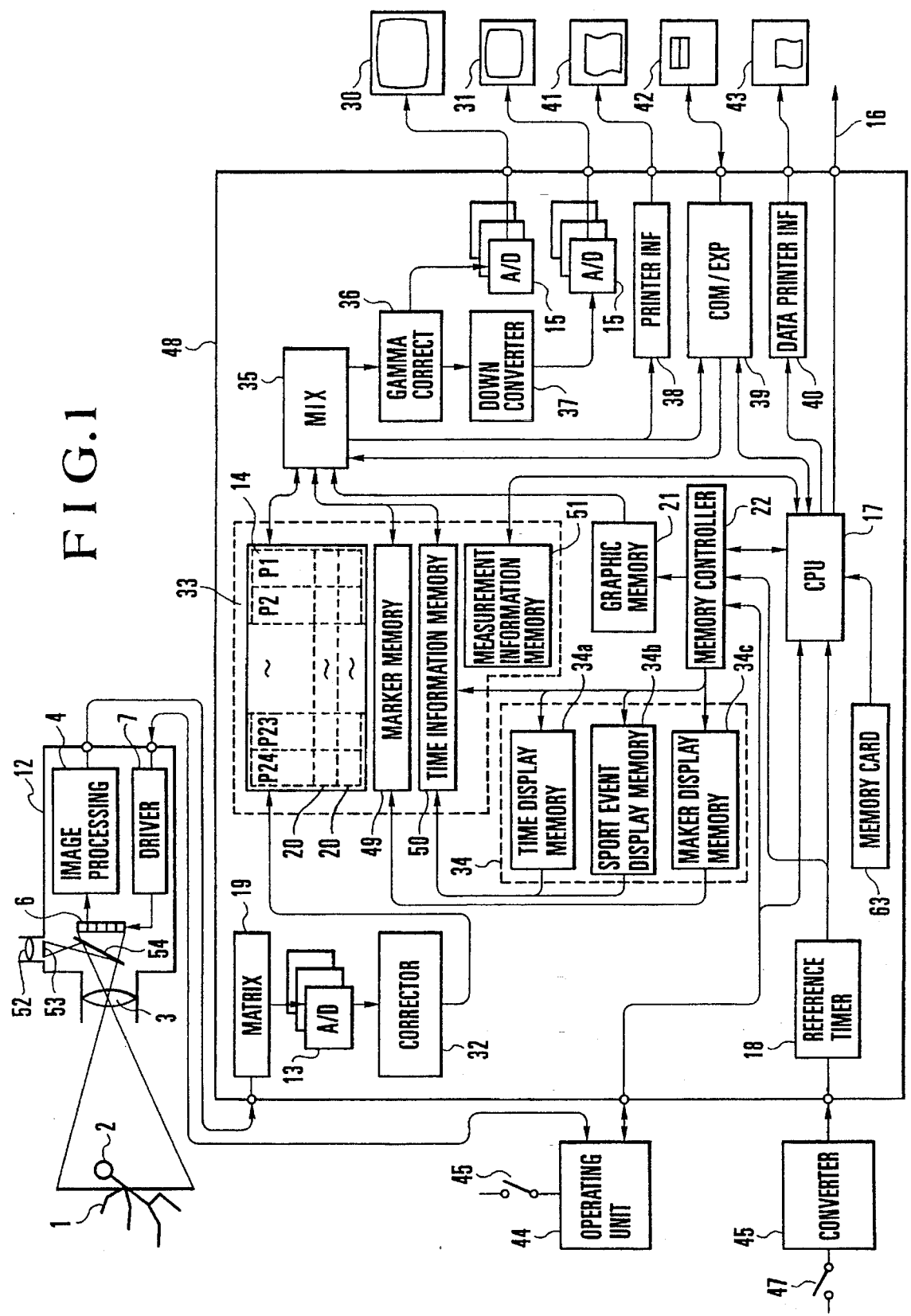
FIG. 1 shows an embodiment of the whole structure of a judging apparatus according to the present invention.

Embodiments of the present inventions will be described below in conjunction with the drawings. FIG. 1 is a block diagram indicative of one embodiment of an inventive apparatus for judging the order of arrival of racers at a goal line, using a color image pickup, and the race time. The present apparatus is composed mainly of a linear sensor camera 12, an image processor 48, an operating unit 44, a signal converter 46, a color high-resolution monitor 30, a color monitor 31, a video printer 41, an opto-magnetic disk recorder 42 and a data printer 43.

The linear sensor cameral 12 is installed on an extension of a judgement criterion line 1 such as the goal line and adjusted such that the criterion line 1 coincides with a marker (reticle line) indicative of a range of image pickup in a reticle 53 of a finder 52. The image of a moving object 2 passing the judgement criterion line 1 is focused by a lens 3 onto a color linear sensor 6. A spectroscopic system 54 such as a half mirror or a spectroscopic prism is used to split and send light from the image of the object on the criterion line 1 to the color linear sensor 6 and the finder 52. The color linear sensor 6 is operated by a driver 7 which generates a drive signal corresponding to a primary scan period set by the operating unit 44 to output the resulting green (G), blue (B) and red (R) color signals through an image processing unit 4 to the image processor 48.

The color linear sensor 6 includes a chip of a one-dimensional array of opto-electric conversion elements with color filters of G, B, R, or their complementary colors superposed on the conversion elements, by which G, B and R color signals are detected from the sensor 6. For example, the sensor 6 includes a one-dimensional color linear sensor of 5,184 commercially available pixel opto-electric conversion elements and with G, B, R pixel sizes of 7 μm in the primary scan direction ×21 μm in the secondary scan direction.

The main scan direction of the linear sensor is a direction in which the opto-electric conversion elements are arranged and is a vertical direction of the image display screen while the secondary scan direction is a direction perpendicular to the direction in which the opto-electric conversion elements are arranged and in which the light enters the linear sensor, and a horizontal direction of the display screen. Thus, the image obtained by repeated scan of the linear sensor is obtained by repeated horizontal-direction scan of a line image on a vertical line with time. Therefore, the moving object forms an image whereas a stationary object on the background provides the same image at all time, so that it is displayed as a horizontal stripe.

The driver 7 scans the color linear sensor 6. The electric charges stored in the opto-electric conversion elements of the sensor 6 are sent to a CCD register (not shown) simultaneously with each scan to be converted to G, B and R electric signals, which are then input to the image processing unit 4.

The image processing unit 4 amplifies, clamps, gamma corrects, samples and holds G, B and R signals and delivers the resulting G, B and R signals to the image processor 48.

The G, R and B color signals to the image processor 48 are then converted by a matrix circuit 19 to a luminance signal Y and color difference signals Pb, Pr, which are then quantized by an A/D converter 13, for example, to corresponding 8-bit (256-gradation) signals.

The signals Y, Pb and Pr are obtained from the following expressions on the basis of BTA (Broadcasting Technique Development Association ) standards:

$Y=0.701G+0.087B+0.212R$ $(B-Y)=-0.701G+0.913B-0.212R$ $(R-Y)=-0.701G-0.087B+0.788R$ $Pb=(B-Y)/1.826$ $Pr=(R-Y)/1.576$

The quantized digital video signals are written into an image/data memory 33 through an image corrector 32 which corrects shading effects on those video signals caused by uneven sunlight or illumination or the shade of a building onto the judgement criterion line 1 and which compresses a white portion of an excessive image level. While in FIG. 1 the matrix circuit 19 is shown as being disposed before the A/D converter 13, it may be disposed behind the A/D converter 13 to digitally convert the G, B and R color signals to the luminance signal Y and the color difference signals Pb, Pr. Alternatively, when a process in the video corrector 32 and separation of the Y and C signals from each other by the digital operation are performed, it is effective to use the A/D converter 13 whose number of bits used for quantization is 9-12, to compress the number of bits of the resulting digital signal to 8, and to write the digital signals, thus obtained, into the image/data memory 33 in order to provide an excellent image.

When the image signals are written into the image/data memory 33, the luminance signal Y of the whole image information is written into the whole pixel memory 14. The color difference signals Pb, Pr are thinned out, for example, in the direction of the linear sensor 6, the color difference signal of one pixel at the two pixel is omitted, and in the perpendicular direction to that of the linear sensor 6, the color difference signal of one scanning line at two scanning lines is omitted, so that they are compressed the data amount, for example, to one quarter of the uncompressed data amount, and the compressed data are written into the compression memory 20.

The luminance signal Y important to the judging operation should maintain a sufficient resolution. Only the color difference signals Pb, Pr are compressed so as to provide a practically sufficient resolution because the human eyes have a low resolution of colors. This method serves to reduce the memory amount and cost and increases the data transfer rate.

The operating unit 44 commands the operation of recording, reproduction and display etc. of the image processor 48. The color high-resolution monitor 30 or the color monitor 31 reads out image data corresponding to a desired picture at a display period of the monitor from among the color image data written in a semiconductor memory (not shown) of the image processor 48 and displays the read image data.

The color image is a time series color image of the moving object 2 on the judgement criterion line 1. Thus, the order of arrival of the color images at the criterion line is judged.

An example of the capacity of the image memory required for the inventive color order-of-arrival judging apparatus using as a high definition television (Hi-Vision) system will be described below.

The capacities of the image/data memory 33 and more particularly of the image memory are determined by the image structure of the Hi-Vision system and recording capacity required for a sports event for which the present apparatus is used.

First, the image memory for the luminance signal Y will be described. The size of the whole pixel memory 14 for one page is obtained as 1,920 dots (horizontal)×1,035 dots (vertical) from the number of horizontal effective samples of the Hi-Vision system and the number of scanning lines. Although the number of vertical dots obtained is illustrated as 1,035, vertical 1,024 dots (vertical) are employed because the display of the image on the monitor generally involves overscan and partially hidden in an escutcheon and a memory having a capacity of 2 factorial is easy to make.

The number of pages deriving from the above memory size is required to be determined by required image recording time depending on the main scan period of the linear sensor, the image recordable time and a sports event held. When the primary (vertical) scan period of the linear sensor is 0.5 ms, we obtain image recordable time per page = 0.5 ms × 1,920
= 0.96 s Assuming that the racer's image is extracted intermittently each time the racer passes over the goal line or the judgement criterion line 1, and the intermittent recording time per racer is 0.5 seconds, data on the images of about two racers per page is extractable. For example, if it is assumed that the maximum number of racers participating in one athletic track race is about 30, about 15 pages will suffice for recording all the racers. In the present apparatus, 24 pages are employed in consideration of a margin. In FIG. 1, P1–P24 each denote a page number.

The image recordable time for the primary scan period is as follows:

| Primary scan period | | Number of horizontal dots | | Number of pages | | Image recordable time |
|---|---|---|---|---|---|---|
| 0.25 ms | × | 1,920 | × | 24 | = | 11.52 s |
| 0.5 ms  | × | 1,920 | × | 24 | = | 23.04 s |
| 1.0 ms  | × | 1,920 | × | 24 | = | 46.08 s |
| 2.0 ms  | × | 1,920 | × | 24 | = | 92.16 s |
| 4.0 ms  | × | 1,920 | × | 24 | = | 184.32 s |

Now, the remaining color difference signals Pb, Pr will be described. Since the color difference signals are thinned as been described above, the memory size required is reduced to one fourth per page of that of the luminance signal. That is, for the color difference signals Pb, Pt, the memory size suffices for a reduced capacity for 24 pages each having 960 dots (horizontal)×512 dots (horizontal).

Assuming that quantization is performed in 256 gradations (in 8 bits), the luminance signal $Y$: 1920 × 1024 × 24 × 8 bits ≈ 46 Mbytes
the color difference signal $Pb$: 960 × 512 × 24 × 8 bits ≈
11.5 Mbytes
the color difference signal $Pr$: 960 × 512 × 24 × 8 bits ≈
11.5 Mbytes
the whole memory capacity ≈ 46 + 11.5 + 11.5 = 69 Mbytes.

The image/data memory 33 is composed of an image memory composed of the whole pixel memory 14 and the compression memory 20; and a marker memory 49, a time information memory 50 and a measured information memory 51 which records information indispensable for judgement on the order of arrival of the racers at the criterion line and measurement of the race time taken.

The marker memory 49 is a memory for recording information on display of a judge line on a judged image for facilitating the judgement. The time information memory 50 is a memory for displaying a time elapsing since the start of the race on the judged image. Those information items are written from a mix memory 34 to the respective memories 49, 50 in conjunction with the writing operation of an image signal from the linear sensor camera 12 to the image memory composed of the whole pixel memory 14 and compression memory 20.

The measurement information memory 51 records the conditions of the apparatus present when the image signal is written to the image memory, for example, the primary scan period, the written amount of the image, the direction of movement of the object, sports event, and the address and time where the intermittent writing operation is performed.

The image/data memory 33 is composed of the memories which store the above information, which is recorded on a recording medium such as an opto-magnetic disk unit 42 to reproduce all the information required for the judgement of the order of arrival of the racers at the goal line.

The mix memory 34 is a buffer memory which writes time and character information at high speed into the marker memory 49 and the time information memory 50 simultaneously with writing of the data into the image memory composed of the whole pixel memory 14 and the compression memory 20. The mix memory 34 is composed of a time display memory 34a, a sports event display memory 34b and a marker display memory 34c.

For writing of figures/characters into the image memory, the CPU 17 writes character data from a general-purpose Chinese character generator ROM by software into the time display memory 34a, sports event display memory 34b and marker display memory 34c at sufficiently respondable periods, and transfers information from those memories at high speed by hardware to the marker memory 49 and the time information memory 50 simultaneously with the writing of the image data to the image memory.

A memory controller 22 controls addressing the image/data memory 33, the mix memory 34 and a graphic memory 21 which displays characters/figures setting measurement time, a comment and a sports event in order to read/write information from/to those memories.

The image memory composed of the whole pixel memory 14 and compression memory 20; the marker memory 49; and the time information memory 50 in the image/data memory 33 each use a dual port RAM. The write timing for the dual port RAM should be equivalent to the primary scan period of the color linear sensor 6 and the corresponding clock rate and the write direction should coincide with the primary scan direction of the linear sensor. The read timing should be synchronous with a sync signal of the output image signal. If the inventive apparatus conforms to a high definition television system, its horizontal frequency is 33.75 kHz; its vertical frequency is 60 Hz; the interlace is 2:1; its read direction is perpendicular to its write direction.

The image information items read from the whole pixel memory 14, compression memory 20, marker memory 49, time information memory 50 and graphic memory 21 under the control of the memory controller 22 is combined by a multiplexer 35 into a set of image information items Y, Pb, Pr displayed on the monitor.

This image information is delivered in two routes, one from the gamma corrector 36 through the D/A converter 15 to color high-resolution monitor 30; and the other from the gamma corrector 36 through the down converter 37 and the D/A converter 15 to color monitor 31. The color high-resolution monitor 30 is supplied with a high definition television system image signal to display all image information recorded in the image/data memory 33 and to measure the time elapsing since the start of the race where the moving object 2 passes the judgement criterion line 1, using the image on the display screen.

The image signal for the color monitor 31 is of a regular NTSC or PAL, SECAM system and used as television broadcasting and as services in the sports stadium which require no high-resolution image. Conversion from the high definition television system to the NTSC or PAL, SECAM system is made by the down converter 37.

The conversion of the number of scanning lines by the down converter 37 is made in a "2-minus-1" system in which the scan lines are thinned out every other line and in which conversion of the number of scanning lines is easy. If the effective number of scanning lines in the high definition television system for the image/data memory 33 is 1,024, one half of which is 512 scanning lines and would exceed the effective number of scanning lines which is 485 in the NTSC system. Thus, the image processor 48 is required to be designed such that two systems may be selected, one which cuts away upper and lower portions of an image of a high definition television system and displays the resulting image in the conversion of the number of scanning lines by the down converter 37 and the other which extracts the image of the moving object 2 on the judgement criterion line 1 by limiting the number of scanning lines to twice the number of scanning lines displayed in the NTSC system or 970 to thereby require no operation of cutting away the upper and lower portions of the image in the conversion of the number of scanning lines.

In order to enable extract those image data, the apparatus has the function of changing the position of starting to read the memory 14 and of changing the number of read image data items to thereby extract selectively a range of image data corresponding to 1,024 effective scanning lines which lay stress on a high definition television image and a range of image corresponding to 970 scanning lines which allows for the NTSC system.

In addition, the reticle 53 in the finder 52 which installs the camera on the judgement criterion line 1 is provided with markers indicative of respective ranges of image pickup corresponding to the 1,204 and 970 effective scanning lines.

Furthermore, actually, a time marker and/or characters indicative of a sports event is required to be superposed in the effective number of scanning lines, so that the maker intervals indicative of a range of image pickup on the rectile 53 in the finder 52 is reduced for an amount of the superposition. The inventive apparatus is further provided with the function of changing positions where the time marker and the sports event are superposed depending on a change of the range of the image pickup. The PAL or SECAM system employs about 585 effective scanning lines, which are more than the NTSC system. Thus, even when a judged picture composed of an image for 1,024 effective scanning lines corresponding to the high definition television system is fabricated and 512 scanning lines due to thinning out in the "2" minus 1" system are used, the whole image can be displayed. Thus, no processes such as a reduction in the number of scanning lines in the display of the NTSC system are required.

Since various printers are used as the video printer 41 depending on the conditions of image quality, printing speed, color, monochrome, etc., outputs in data formats corresponding to interfaces for those printers are required to be prepared. To this end, a printer interface 38 is provided in the form of a replaceable unit.

The images, data, etc., used for judgement of the order of arrival of the racers are required to be held for a certain interval of time. Thus, the data in the image/data memory 33 is recorded in the opto-magnetic disk unit 42. In this case, the data memories including the image memory which includes the whole pixel memory 14 and compression memory 20; the marker memory 49; the time information memory 50; and the measurement information memory 51 are distinguished from each other. Only the image in the image memory is compressed by an image compression/expansion unit 39 and recorded along with the information in the data memory into the disk unit 42. Similarly, the image and judged data are reproduced by way of the image compression/expansion unit 39. The image compression/expansion process is performed for high speed transfer of data in the image/data memory 33 to the disk unit 42. If there is no need for high speed transfer, the image compression/expansion unit 39 is not required to be used.

The racers' order of arrival at the goal line, numbers, goal time, etc., are determined in the order-of-arrival judgement. If those data items are to be printed and held, the data printer 43 is required to be connected. To this end, a data printer interface 40 is provided in the inventive apparatus. In addition, a serial interface 16 is provided to transfer data on the result of the judgement to an external data totalizing host computer, etc.

Data on an sports event and/or a race name written in the sports event display memory 34b is superimposed on the order-of-arrival judgement image. This is performed by transfer of data on the characters from a memory card 63 to the CPU 17 and by selection of data on any character from among data on those characters and writing data on the selected characters into the sports event display memory 34b when the power supply is turned on. In addition to the character data, data on system initialization, data on the figure of a logo mark, data on a manual text, data on the result of the judgement are recordable on the memory card 63.

The operator is capable of providing at the operating unit 44 control over the inventive apparatus which judges the order of arrival of the racers in a race, using color image pickup, and the race time; for example, the switching operation of the primary scan period of the color linear sensor 6, the switching operation of the gain of the image signal, the timer operation, the extraction of the image, the setting operation and display of the image/data memory 33, the setting operation of a sports event, and the operation of the video printer 41, the opto-magnetic disk unit 42, and the data printer 43 and almost all of the judging procedures.

In order to effectively use the image/data memory 33, the image of a moving object 2 is extracted intermittently into the memory each time the object 2 passes over the judgement criterion line 1. To this end, a memory write switch 45 is provided which is depressed by the operator to extract the image of the moving object 2 when same passes the criterion line 1. Alternatively, arrangement may be such that, for example, an opto-electric sensor is provided before the criterion line 1 to detect the passage of the moving object 2 with the signal output of that sensor and contacts of the memory write switch 45 being ORed to thereby automate the extraction of the image into the memory.

Time as a reference for the measurement is generated when a timer start contact 47 starts up a reference timer 18 of the image processor 48 through a signal converter 46. The signal converter 46 prevents the involvement of external noise which causes an issue when the distance from the image processor 48 to the timer start contact 47 is substantial.

(1) An image pickup system for obtaining a color image signal will be explained bellow in cases using a single color linear sensor, a color linear sensor and a monochromatic: linear sensor and three chromatic linear sensors.

An embodiment of an image pickup system which obtains a color image signal in the present invention will be described in conjunction with FIGS. 2–4.

Figure 2:
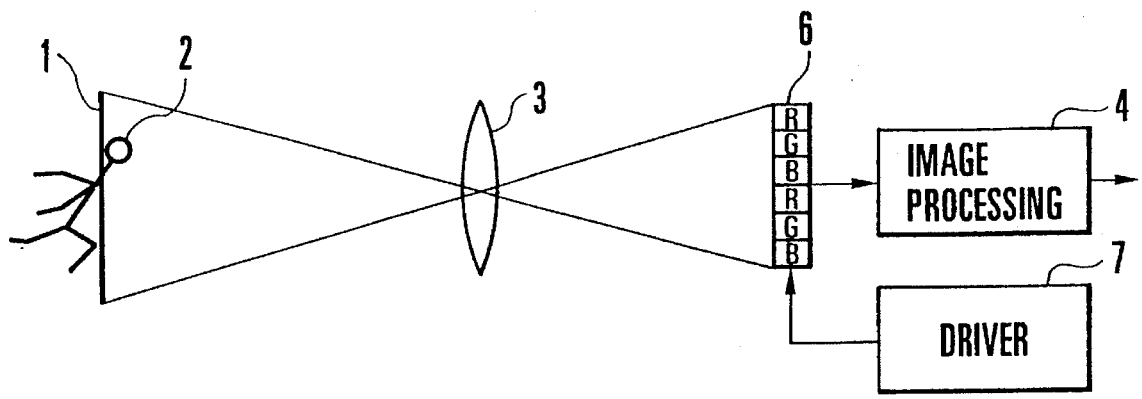
FIG. 2 shows one example employed in the inventive image pickup system.

FIG. 2 shows a system which uses a single color linear sensor 6 which color filters are superposed on the single linear sensor. The judgement criterion line 1 is, for example, a goal line; the moving object 2 is a subject which passes the criterion line 1; and the lens 3 focuses the image of the moving object 2 on the criterion line 1 onto the color linear sensor 6. The image of the moving object 2 focused on the criterion line 1 is decomposed by the color filters on the color linear sensor 6 into G, B and R signals, which are then delivered to the image processing unit 4. The color linear sensor 6 is driven by the driver 7.

According to this system, no color decomposition optical system is used, so that a regular photographic lens as it is is used to thereby maintain the price of the apparatus inexpensive.

Figure 3:
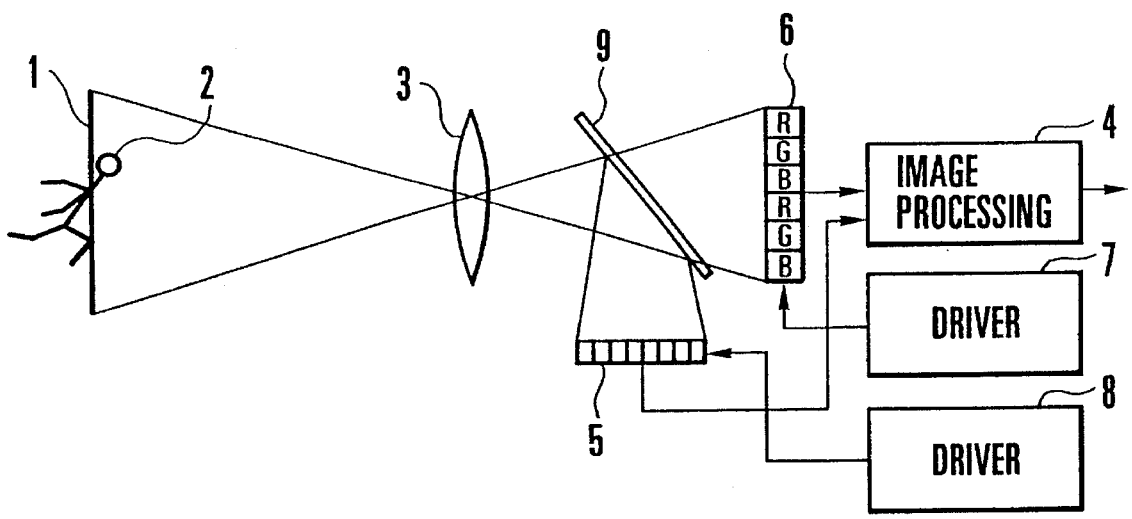
FIG. 3 shows another example employed in the inventive image pickup system.

FIG. 3 shows a system which uses the color linear sensor 6 for a color signal and a monochromatic linear sensor: 5 for a luminance signal. The judgement criterion line 1 is, for example, a goal line; the moving object 2 is a subject which passes the criterion line 1; and the lens 3 focuses the image of the moving object 2 on the criterion line 1 onto the color linear sensor 6 and the monochromatic linear sensor 5. The half mirror or spectroscopic prism 9 splits the incident light from the lens 3 to the color linear sensor 6 and the monochromatic linear sensor 5 the signals from which sensors 6 and 5 are then delivered to the image processing unit 4. The color linear sensor 6 and the monochromatic linear sensor 5 are driven by the drivers 7 and 8, respectively.

Since this system uses no color decomposition optical system, a regular photographic lens as it is is used to thereby maintain the price of the apparatus inexpensive. A high resolution linear sensor and a color linear sensor which has a preference for sensitivity to resolution are selected are used for the luminance signal and the color signal, respectively, to thereby provide an excellent image signal.

Figure 4:
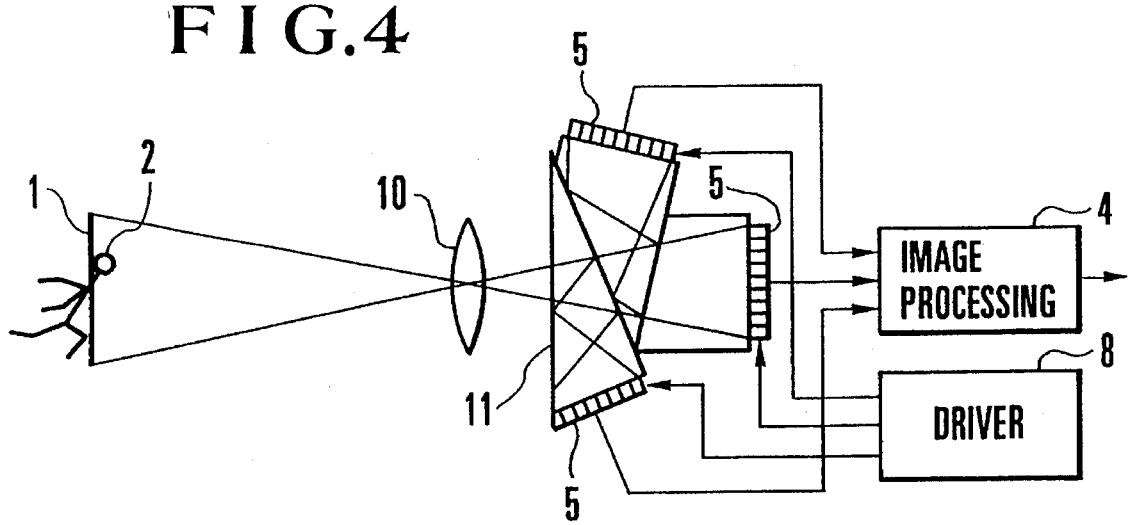
FIG. 4 shows still another example of the inventive image pickup system.

FIG. 4 shows a system which uses three monochromatic linear sensors 5. The judgement criterion line 1 is, for example, a goal line; the moving object 2 is a subject which passes the criterion line 1; and the lens 10 focuses the image of the moving object 2 on the criterion line 1 onto the monochromatic linear sensors 5. The optical color decomposition system 11 decomposes an image from the lens 10 into three primary ( G, B and R ) colors and focuses same onto the G, B and R monochromatic linear sensors 5. In order to insert color decomposition optical systems between the lens 10 and the focusing surfaces of the linear sensors 5, the optical path lengths between the lens 10 and the focusing surfaces of the linear sensors 5 are required to be large. The lens 10 used is a corresponding television one. The G, B and R signals from the linear sensors 5 are then delivered to the image processing unit 4. The monochromatic linear sensors 5 are driven by the driver 8.

Since this system uses the optical color decomposition system, a television lens is required to be used. However, high resolution linear sensors can be used for the G, B and R color signals, so that a high resolution image signal is obtained for luminance and color signals.

(2) The construction of color linear sensor will be explained below.

Figure 5:
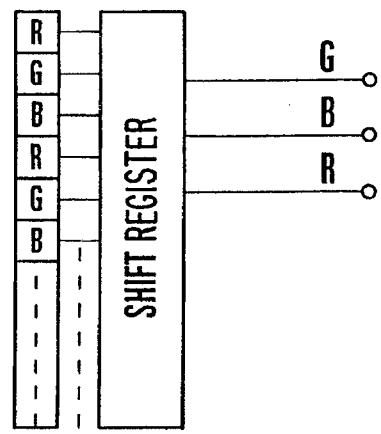
FIG. 5 illustrates a structure of a color linear sensor, used in the present invention.
Figure 6:
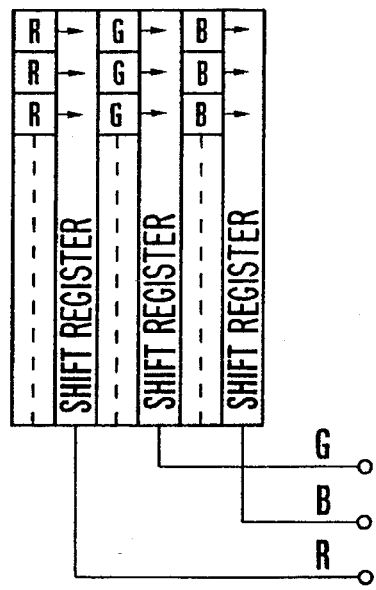
FIG. 6 illustrates another structure of the color linear sensor, used in the present invention.
Figure 7:
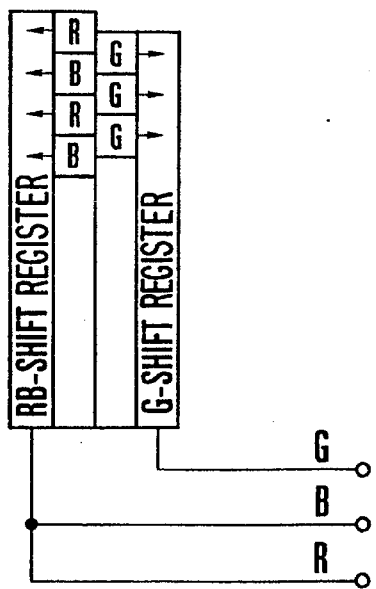
FIG. 7 illustrates still another structure of the color linear sensor, used in the present invention.

FIGS. 5–7 show the structures of the color linear sensors used in the inventive apparatus. As shown in FIG. 5, the color linear sensor used has a structure in which G, B and R color filters are arranged repeatedly in this order along a single line on a opto-electric conversion element in the primary scan direction. Although some color sensors have a filter disposition structure, as shown in each of FIGS. 6 and 7, their resolution in the secondary scan direction is required to be high in order to judge the order of arrival of the racers at the goal line, and the pixel width $W_s$ of the color sensors in the secondary scan direction (perpendicular to the primary scan direction) for determination of its resolution must be minimized. The detailed reason for this will be described next.

Figure 8:
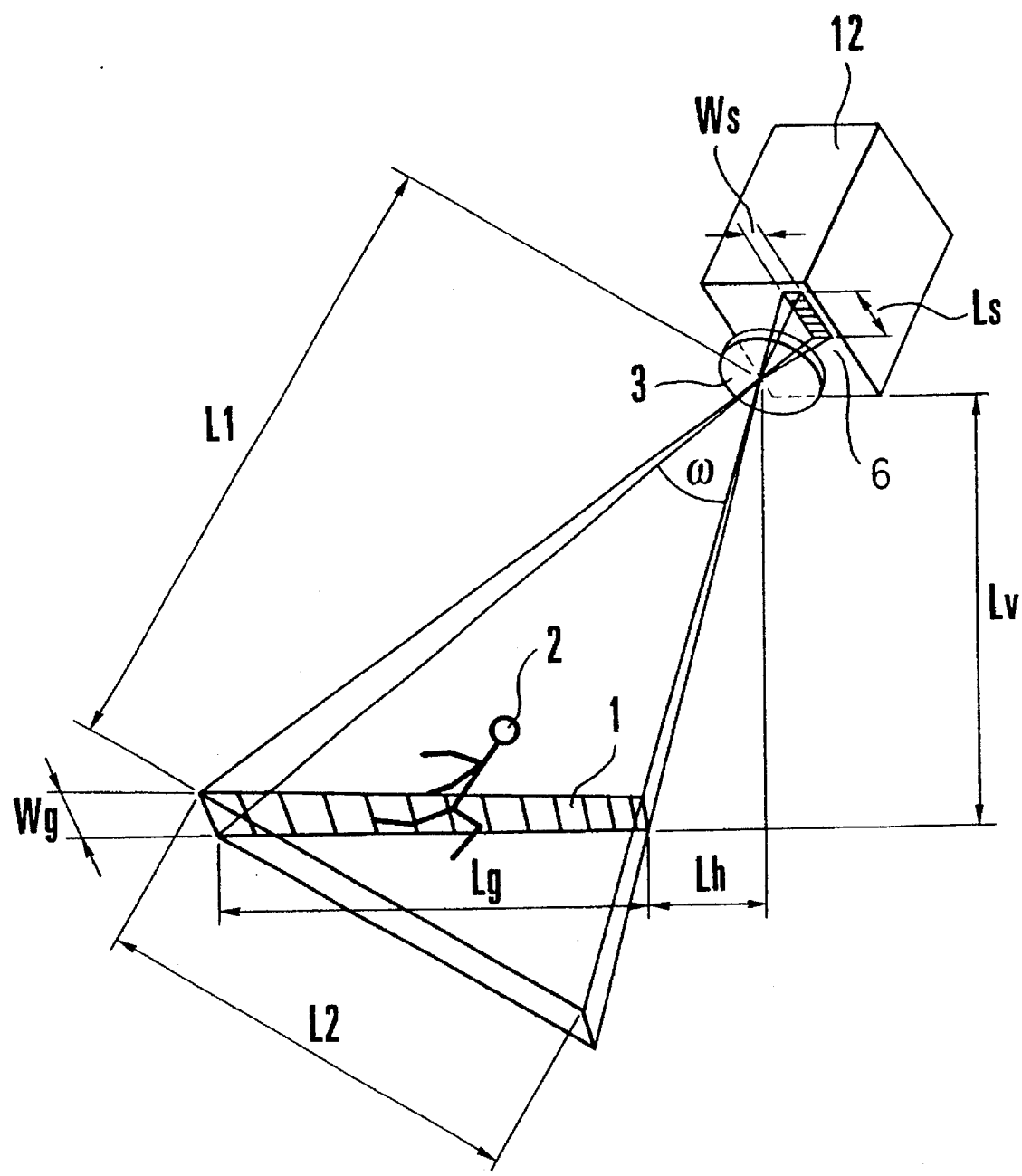
FIG. 8 illustrates the relationship between the pixel width of the linear sensor and the range of image pickup of the sensor on a judgement criterion line.

FIG. 8 shows the relationship between the pixel width $W_s$ of the linear sensor and a range of image pickup $W_g$ on the criterion line 1 which the pixel width $W_s$ picks up.

The camera head 12 is provided to set the focal length of the lens 3 appropriately such that the range $L_g$ of the judgement criterion line 1 to be imaged is picked up into an effective pixel dimension $L_2$ in the primary direction which is the range of image extraction of the color linear sensor 6. The image angle ω of the lens is determined uniquely from the effective pixel dimension $L_s$ of the sensor in the primary scan direction which is capable of extracting the image and the range $L_g$ of the criterion line 1 to be imaged. Thus, the pixel width $W_s$ of the color linear sensor 6 in the secondary scan direction picks up as an image the range of image pickup $W_g$ on the criterion line 1 for the same lens image angle ω.

This will be described further, using an example of an athletic sport which requires an accuracy of judgement of $1/1,000$ seconds. In the case of a "male 100-meter dash" which is an athletic sport where the speed of the moving object 2 is the maximum, the object moves about 10 mm in $1/1,000$ seconds. Thus, preferably, the sum of an image distortion due to storage of signal charges between the adjacent scanning periods of the sensor in the primary scan direction and an image distortion due to the range of image pickup $W_g$ on the criterion line 1 which the pixel width $W_s$ in the secondary scan direction picks up is 10 mm or less.

Assuming that the scan frequency of the sensor in the primary scan direction is 2 kHz, the scan period is $1/2,000$ seconds during which the moving object 2 moves about 5 mm. Thus, the image distortion due to storage of signal charges is for 5 mm. Preferably, the remainder of the acceptable distortion dimension is 5 mm while the range of image pickup $W_g$ on the criterion line 1 which the pixel width $W_s$ of the sensor picks up in the secondary scan direction picks up is 5 mm or less.

Let the horizontal and vertical distances Lh and Lv as a standard position of camera installation on a sports stadium be 20 and 15 m, respectively; let the range $L_g$ of the criterion line 1 to be imaged or the length of the goal line be 14; let the effective pixel dimension of the sensor in the primary scan direction be $L_{s1}$; and let the range of image pickup $W_g$ on the criterion line 1 be 5 mm. In this case, the pixel width $W_s$ of the sensor in the secondary scan direction is calculated from the following expression:

$$\omega = \tan^{-1}\frac{Lg + Lh}{Lv} - \tan^{-1}\frac{Lh}{Lv} =$$

$$\tan^{-1}\frac{34(m)}{15(m)} - \tan^{-1}\frac{20(m)}{15(m)} \approx 13°$$

$$L_1 = \sqrt{(Lg+Lh)^2 + Lv^2} \times \cos\frac{\omega}{2} =$$

$$\sqrt{34^2 + 15^2} \times \cos\frac{13°}{2} \approx 37(m)$$

$$L_2 = 2 \times L_1 \times \tan\frac{\omega}{2} =$$

$$2 \times 37(m) \times \tan\frac{13°}{2} \approx 8.4(m) = 8400(m)$$

$$Ws : Wg = Ls : L_2$$

$$\therefore Ws = \frac{Wg \times Ls}{L_2} = \frac{5(mm) \times Ls}{8400(mm)} = \frac{Ls}{1680}$$

As shown in the above expression, the pixel width $W_s$ of the sensor in the secondary scan direction which satisfies the required accuracy is calculated from the effective pixel dimension $L_s$ of the sensor in the primary scan direction. As the effective pixel dimension $L_s$ increases, an allowable value of the pixel width $W_s$ increases, but the magnitude of the effective pixel dimension $L_s$ is limited by the optical system used. For example, the maximum effective image dimension of a 1-inch lens for the television set is 16 mm and the maximum effective image dimension of a 35-mm photographic lens is about 43 mm.

Assuming that there is a sensor having an effective pixel dimension $L_s$ matching with the maximum effective image dimensions of those lenses, the pixel width $W_s$ of the color sensor in the secondary scan direction which satisfies the required accuracy is calculated from the above expression as follows:

$$\text{Television lens}: W_s = L_s/1{,}680$$
$$= 16 \text{ (mm)}/1{,}680 = 9.5 \text{ }(\mu m)$$
$$\text{Photographic lens}: W_s = L_s/1{,}680 = 43 \text{ (mm)}/1{,}680$$
$$= 25.6 \text{ }(\mu m)$$

As mentioned above, in the case of a linear sensor camera of a single color linear sensor or a linear sensor camera of a color linear sensor and a monochromatic linear sensor, a photographic lens is usable. Thus, the pixel width $W_s$ of the color sensor in the secondary scan direction which satisfies the required accuracy is 25.6 µm or less. Although the effective pixel dimension $L_s$ of the sensor is assumed to match with the effective pixel dimension of the lens, the pixel width $W_s$ is actually required to be calculated from the effective pixel dimension $L_s$ of the sensor used.

As an example, the required accuracy of a color linear sensor is calculated which has a structure in which G, B and R color filters are arranged in a single row in the primary scan direction on an opto-electric conversion element described in the embodiment of FIG. 1. Since the effective pixel width $L_s$ of the color sensor in the primary scan direction is about 36 mm (5,184 pixels×7 µm) and the pixel width $W_s$ of the color sensor in the secondary scan direction is 21 µm, it will be seen that the sensor satisfies the required accuracy as follows:

$$W_s = 21 \text{ }\mu m \leq L_s/1{,}680 = 36 \text{ (mm)}/1{,}689 = 21.4(\mu m)$$

Although color linear sensors having a filter arrangement structure of FIG. 6 or 7 commercially available as articles have been studied, as mentioned above, they are not recommendable at present as a color linear sensor used for judgement of the order of arrival of the racers at the goal line because the pixel width $W_s$ of all those sensors in the secondary scan direction greatly exceed the required accuracy. However, if color linear sensors which satisfy the above requirements are commercially available in the future, they will be usable.

Although the conditions of use of the photographic lens were calculated, the requirements of the dimensional accuracy of the pixel width $W_s$ are severe when a television lens is used. Thus, it would be conceived that the sensors which satisfy the requirements but have a narrow pixel width $W_s$ have a narrow pixel area to thereby affect their sensitivity adversely. Although it is possible to add an optical system to the television lens to increase the effective image dimensions, the resulting lens would be expensive. Thus, as mentioned above, an image pickup system of a single color linear sensor or an image pickup system of a color linear sensor and a monochromatic linear sensor would be practical compared to the system using three monochromatic linear sensors.

(3) Record and reproduction of a color image signal will be explained below.

Figure 9:
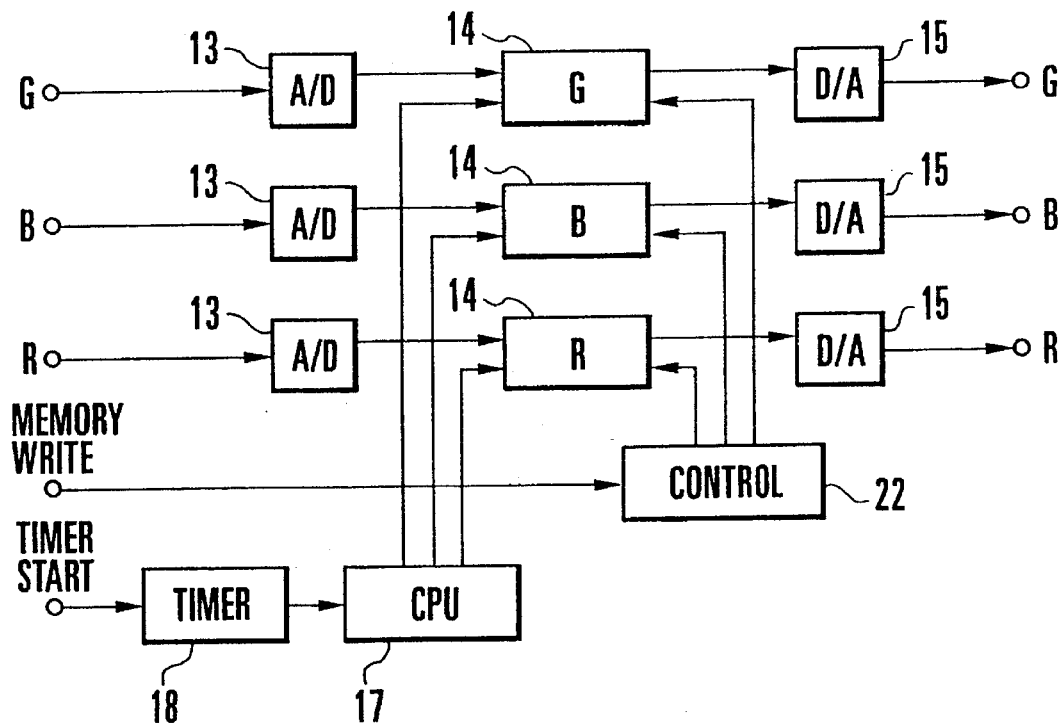
FIG. 9 shows an embodiment of the structure of a memory into which a color image signal is stored in the present invention.
Figure 10:
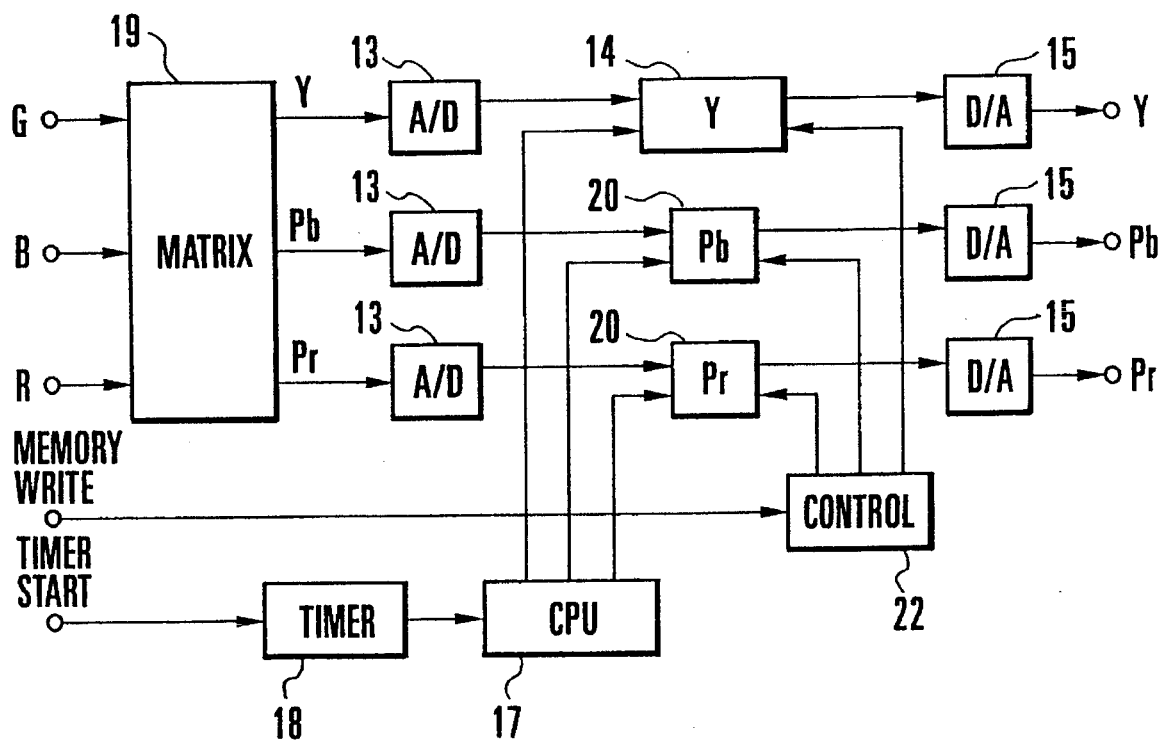
FIG. 10 shows another embodiment of the structure of a memory into which a color image signal is stored in the present invention.

FIGS. 9 and 10 each shows the structure of a memory into which a color image signal obtained by a system which uses a single color linear sensor, a system which uses a color linear sensor and a monochromatic linear sensor, or a system which uses three monochromatic linear sensors is extracted.

In the memory structure of FIG. 9, for the G, B and R color image signals obtained from a linear sensor, all image information obtained by the primary scan of the linear sensor and obtained with a clock frequency of the primary scan is recorded into the memories 14 along with the G, B and R color signals as they are to reproduce a high resolution image signal. In the memory structure of FIG. 10, a luminance signal Y and color difference signals Pb, Pr are obtained by the matrix circuit 19 from the G, B and R signals. The luminance signal Y especially important to judgement of the order of arrival of the racers at the goal line records all the image information obtained from the primary scan of the linear sensor and its clock frequency with into the memory 14 while the color difference signals Pb, Pr of color information components whose main object is to discriminate the moving object 2 are thinned out as to the pixel information as much as possible to thereby record the resulting information into the memory 20 and to save the memory capacity. This data thinning-out control is a well-known technique which the CPU 17 uses.

Although the system of FIG. 9 is capable of reproducing an image of high resolution, the whole pixel memory 14 is used for the respective G, B and R signals. Thus, the amount of memory used and hence its cost increase. Also, when a judged image is recorded on an image recording medium such as an opto-magnetic disk unit, optical disk unit, magnetic disk unit, or VTR, the number of pictures recorded on the image recording medium is limited because its amount of information is immense and the time taken to record the judged image is also immense.

The system of FIG. 10 is constructed in view the fact that the resolution of human eyes to a color signal is low. It aims mainly at the distinction of a moving object. Thus, the system is characterized in that color signal components or color difference signals Pb, Pr are reduced in information amount to a half or a quarter compared to the luminance signal Y, which resulting information amount is then stored in the compression memory 20 to thereby reduce the memory amount and hence cost, that the number of pictures accommodatable on the image recording medium will increase, and that the time taken for the recording is reduced.

A method of compressing the color difference signals Pb, Pr to reduce an information amount includes a method of sampling the color signals every other scan only in the secondary scan direction of the linear sensor to reduce the information amount to one half, a method of sampling the color difference signals every other pixel only in the primary scan direction to reduce the information amount to one half, and a method of sampling the color difference signals every other pixel and every other scan in the primary and secondary scan directions of the linear sensor to reduce the information amount to a quarter.

The thought that the color difference signals Pb, Pr are only required to enable distinction of moving objects according to color if there is the luminance signal Y as an order-of-arrival judgement image may be promoted to sample the image signal every other scan in the secondary scan direction and to sample the image signal every two or three pixels in the primary scan direction which influences the accuracy of the judgement less than in the secondary scan direction to reduce the information amount of the color difference signals Pb, Pr to one sixth or one eighth of the luminance signal Y to thereby obtain a practical image.

(4) A system for obtaining a color television image signal from one-dimensional linear sensor will be explained below.

In order to obtain a standard color television image signal from a one-dimensional linear sensor in the present invention, a scan frequency conversion process of FIG. 11 is performed. When, first, the primary scan frequency of the color linear sensor is 1 kHz, an image signal is obtained at a period of 1 ms (frequency of 1 kHz) on the judgement criterion line 1. Its scan frequency is quite different from that of the standard color television system and cannot be displayed as it is on the television monitor. In order to cope with this situation, the inventive apparatus employs a system where, in order to convert the image signal to horizontal and vertical scan frequencies identical to that of the color image signal of the standard color television system, the image signal from the color linear sensor 6 is recorded temporarily in the scan converter memory 23 with a memory control signal from the memory write control unit 24 synchronous with the drive signal to the color linear sensor 6, and data in the scan converter memory 23 is read with a memory control signal from the memory read control unit 25 whose frequency and synchronous system are coincident with the standards of the standard television system.

First, a method of writing the image signal will be described in conjunction with FIG. 11. The G, B and R color signal from the camera head 12 are quantized by the A/D converters 13, for example, to 8-bit digital signals, which are then written into the scan converter memories 23. A memory control signal for writing purposes is obtained from the memory write control unit 24 as a signal synchronous with the drive signal for the color linear sensor 6. The image signals from the A/D converters 13 are written into the scan converter memories 23 in its vertical direction so as to coincide with the primary scan of the color linear sensor 6. Each time the scan of the color linear sensor 6 is repeated, the memory is scanned secondarily and written with the image signal in a horizontal direction in a time series, sequentially starting with one end of the memory to thereby form one picture.

In reading, image signals are read from the memories 23 in accordance with a memory control signal from the memory read control unit 25 which operates with a frequency of the high definition television system. For example, in the case of the number of scan lines being 1,125 (the effective number of scan lines being 1,024); the total number of samples per scan line being 2,200 (the effective number of samples being 1,920); the interlace being 2:1; and the field frequency being 60 Hz, the uppermost pixel row of the scan converter memory 23 is read in the horizontal direction in the first field with a frequency of 33.75 kHz and a clock frequency of 74.25 MHz (=33.75 kHz×2,200). This operation is iterated for 512 lines in a vertical direction every other pixel row. In the next field, each of the G, B and R image signals for the remaining 512 lines is read to which signal a blanking signal and a sync signal are added to provide a high definition television signal.

The memory elements of the employed scan converter memory 23 each are a dual port memory which is supplied separately with a write and a read clock frequency and which can be written and read simultaneously.

The image/data memory of the image processor used in the inventive apparatus includes the whole image memory (for 24 picture pages in the high definition television system) having a function equal to that of the above scan converter to thereby simultaneously extract/display an image into/from any picture in the whole image memory on the television monitor.

In the case of a television camera 27 using a two-dimensional area sensor 26 of FIG. 12, the sensor 26 is driven in the driver 29 with a sync signal of a frequency matching with the standard color television system. Thus, the image signal from the area sensor 26 is obtained as a horizontal and a vertical signal both matching with the standard color television image signal.

This image signal becomes G, B and R different image signals through the television image processor 28. In this case, since the sync frequency matches with the standard color television System, a memory circuit which is intended for frequency conversion is not required, and the different image signals as they are are input to, and displayed on, the television monitor.

(5) The required functions of the color order-of-arrival judging apparatus will be explained below.

Next, the details of the functions of the inventive color order-of-arrival and time judging apparatus will be described in conjunction with the drawings.

(i) The functions of selecting the primary scan period relative to the speed of movement of a moving object and reducing/enlarging an image:

The aspect ratio of the object on the video monitor which displays a judged image varies depending on the position of installation of a camera which depends on the size of a sports stadium where the inventive apparatus is installed; the range of the judgement criterion line, the image of which is to be picked up, depending on a sports event used; and different speeds of the moving objects. For example, for simplifying purposes, extraction of data into the memory, the data being on judged images of two moving objects where the speed of one object is twice that of the other object in the range of image pickup on the same judgement criterion line will be described below in conjunction with FIGS. 13 and 14.

Since the number of horizontal dots displayable on the monitor screen is 1,920 from the standards of the horizontal resolution of the high definition television system, an image on the judgement criterion line for each primary scan of the color linear sensor obtained from the linear sensor camera is for 1,920 scans per monitor picture. If the primary scan period is 1 ms, the image display time is 1.92 seconds for 1,920 scans. That is, an image on the judgement criterion line for 1.92 seconds is displayed on one monitor picture.

Figure 13:
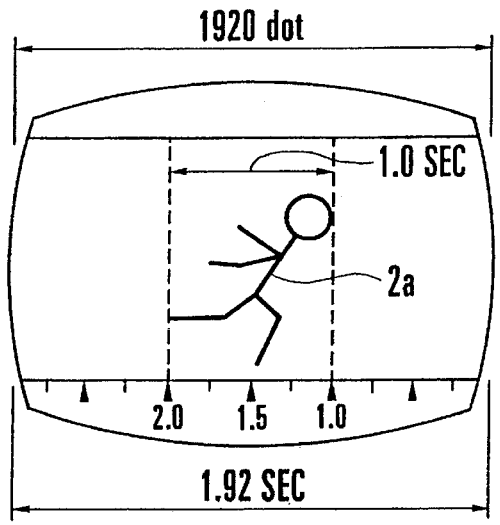
FIGS. 13–15 illustrate a primary scan period versus the speed of a moving object, and reduction/enlargement of an image.
Figure 14:
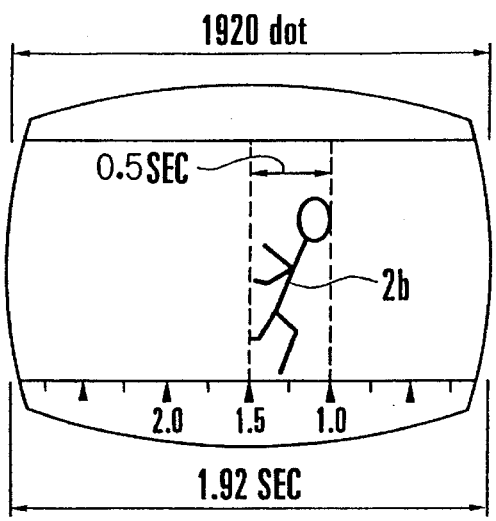

If a moving object 2a has a speed passing the criterion line 1 in 1.0 seconds and a moving object 2b has a speed at which the object 2b passes the criterion line 1 in 0.5 seconds, those objects are displayed as images of FIGS. 13 and 14, respectively, on the color high-resolution monitor 30. In order to display those images as ones which are not greatly different from the aspect ratio of actual moving objects without a sense of incompatibility, the inventive apparatus must have the function of either changing the primary scan period or reducing/enlarging the image.

Figure 15:
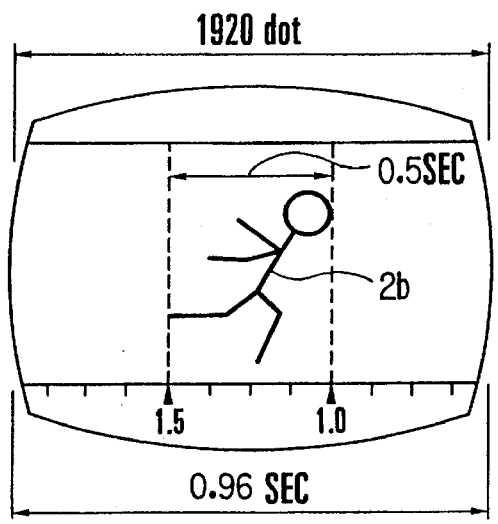

When the primary scan period is changed to 0.5 ms, the image display time is 0.96 seconds for 1,920 scans. Thus, an image for 0.96 seconds is displayed on one monitor picture. Thus, when the image of the moving object 2b which passes the criterion line 1 in 0.5 seconds is picked up, the image is displayed on the monitor screen in the same size as that of FIG. 13, as shown in FIG. 15. Even when the image on the monitor screen of FIG. 14 is enlarged twice in the horizontal direction, the resulting image is displayed on the monitor screen with a size similar to that of the image of FIG. 13.

In order to realize those functions, the inventive apparatus has the function of selecting a primary scan period of 0.25, 0.5, 1.0, 2.0 or 4.0 ms and the function of reducing and enlarging the respective length and breadth of an image by a factor of ⅕, ½, 1, 2, 3 or 4. The inventive apparatus uses those functions to change the range of image pickup of the judgement criterion line determined by the position of installation of the camera depending on the size of the sports stadium and the aspect ratio of the object depending on the speed of movement of the object to thereby display an image which is not greatly different in actual aspect ratio from the actual moving object without a sense of incompatibility.

(ii) The Superimposition of a Judgement Criterion Line and the Function of Moving a Cursor for each Judgement Criterion Line The unit of judgement is determined depending on a sports event using the inventive apparatus. For example, the unit of judgement of field and track sports is ¹⁄₁₀₀ seconds.

Figure 16:
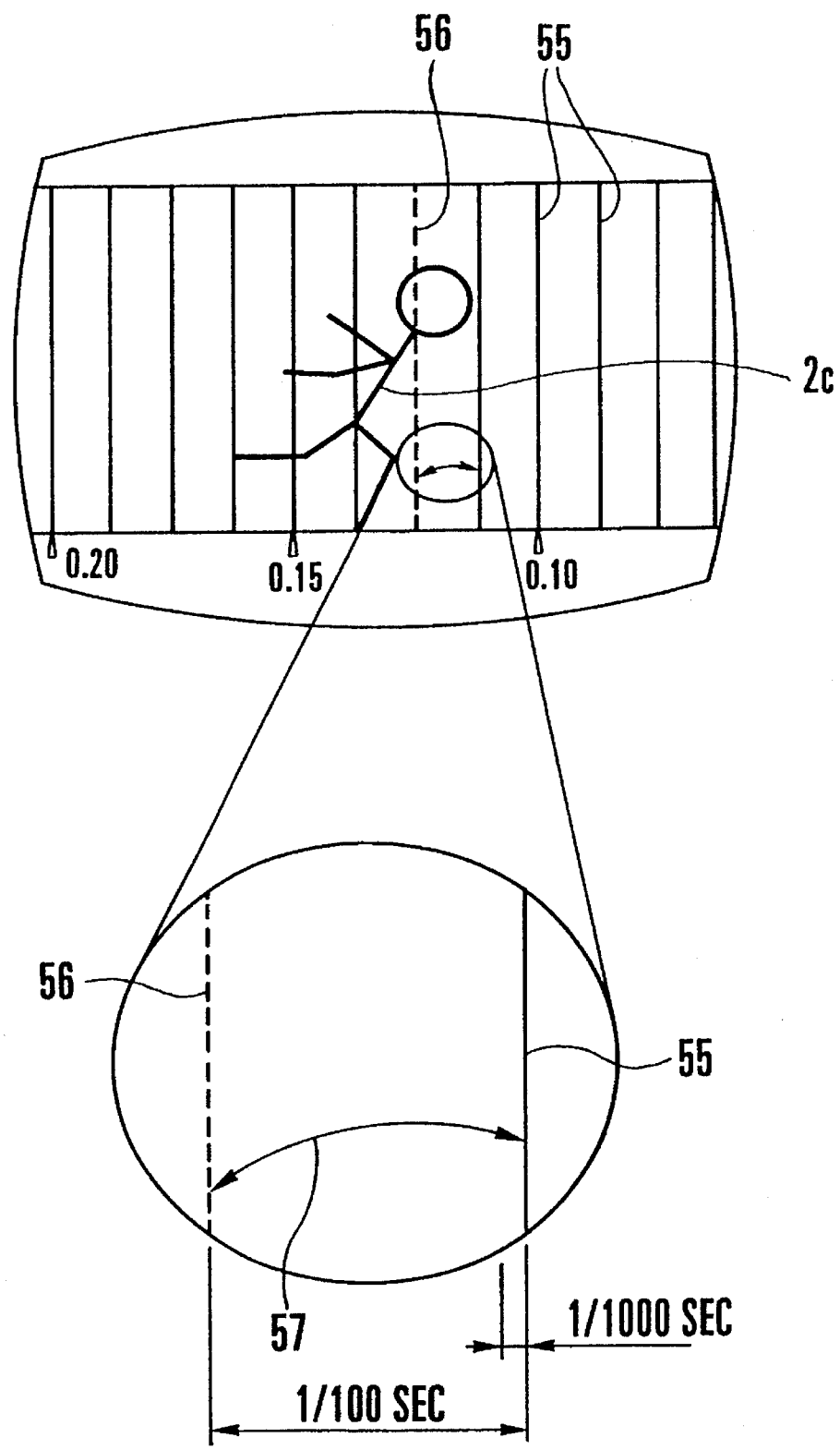
FIG. 16 illustrates the function of superimposition of judgement lines on a judged image and of movement of a cursor line for each judge line.

As shown in FIG. 16, the present apparatus forms units of judgement including vertical judgement lines 55 superimposed at fixed intervals on a judged image to facilitate the judgement. Those judgement lines are formed by supply of information in the marker memory 49 of FIG. 1 to the multiplexer 35. Superposition or non-superposition is easily selected by the operation of a switch on the operating unit 44. Since, preferably, the unit of judgement is coincident with the unit of time measurement, the present apparatus has the function of limiting the position to which a time measurement scale is movable in the automatic time measurement to the judgement criterion line 55 alone. The measurement scale is produced by the marker memory 49 through the CPU 17 and the memory controller 22.

Referring to FIG. 16, those operations of the present apparatus will be described next. In the measurement state, the time measurement scale 56 is moved to the position of the target moving object 2c and the time when the object passes the judgement criterion line is measured. When the measurement scale 56 is moved right and left on the monitor screen, the scale is managed by software such that the time measurement scale is moved to a target position every 10 dots or every ¹⁄₁₀₀ seconds when the primary scan period is 1 ms to thereby move the scale at all at an interval 57 of movement of ¹⁄₁₀₀ seconds on the judgement line 55 as the unit of judgement. Of course, the scale may be moved at intervals of a dot to measure the position of the scale at intervals of ¹⁄₁,₀₀₀ seconds.

Although the measurement scale is displayed on the monitor screen in a colored solid line such as a white or green which is easily distinguished from the judged image, it is shown as a broken line segment in FIG. 16 for convenience's sake.

(iii) A Printer Interface Function

Practical video printers combined with the present apparatus are for high definition televisions; for NTSC, PAL and SECAM systems; of the type which receives image information in the form of a digital signal; of the type which receives a line scan image signal as in the primary scan of the linear sensor, etc.

The printer interface 38 of FIG. 1 has an interface function for the type which receives an image signal in the form of a digital signal and for the type which receives a line scan image signal.

The printer interface gives the function of sending address data and image data to the type which receives image information in the form of a digital signal to the receipt format of the printer. The printer interface gives to the type which receives a line scan image signal the function of reading image information from the image/data memory 33 in the primary scan direction of the linear sensor simultaneously with writing the image information into the image/data memory 33 and printing the judged image with the direction of paper feed as the secondary scan direction.

Figure 17:
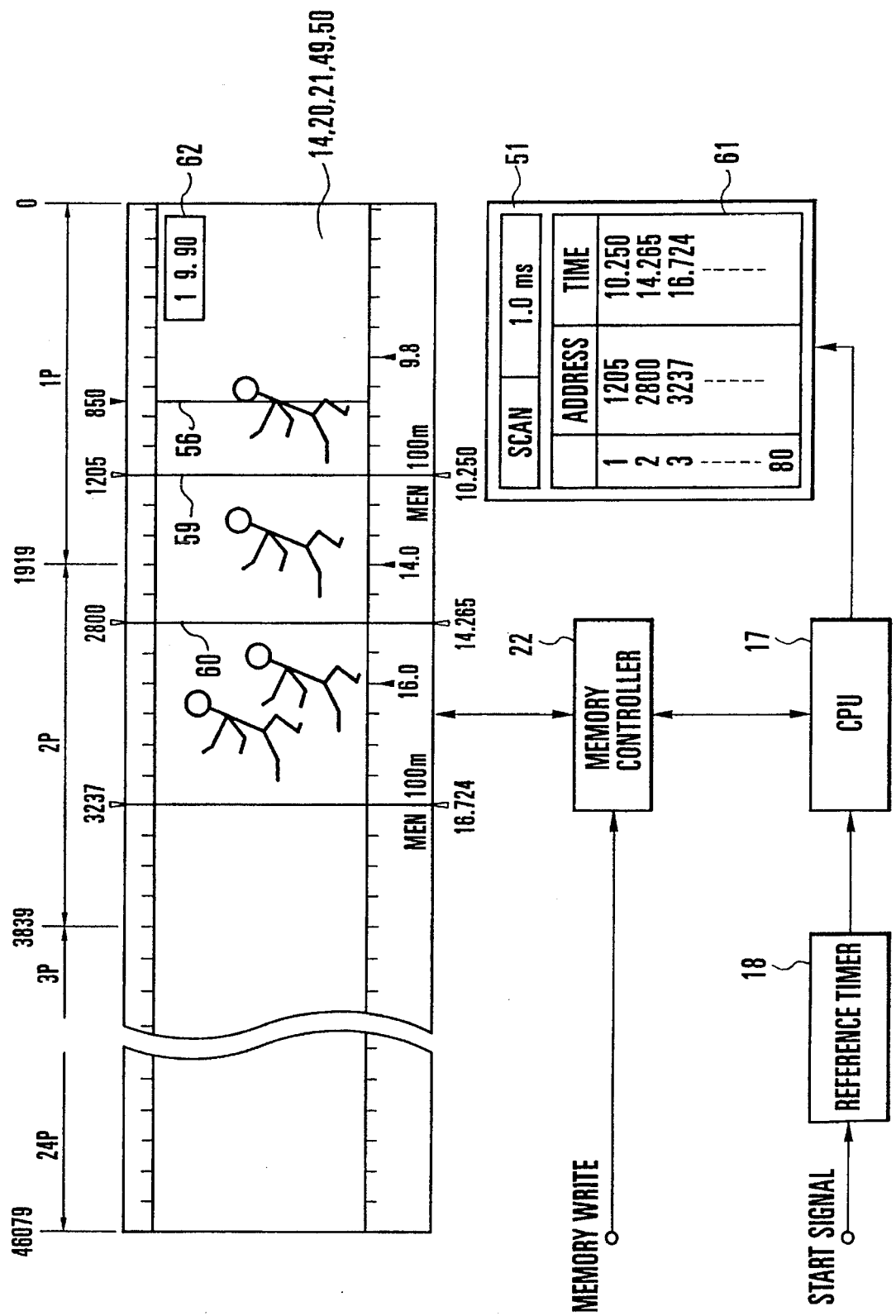
FIG. 17 illustrates the measurement of the time taken for movement of a mobile object.

(iv) A Time Measurement Function:

The present apparatus employs a system for calculating race time from the value of a relative address, as shown in FIG. 17, as a system which measures a time elapsing since the start of a race for moving objects which pass the judgement criterion line. The pixels of the image on the judgement criterion line are extracted sequentially into locations at horizontal address "0" to "46,079". When the moving object does not pass the criterion line to use the memory effectively, no image data is written into the memory. Each time a moving object passes the criterion line, image data is written intermittently into the memory. This operation is iterated to extract the judged image into the memory.

The address of a point where the intermittent writing started and obtained from the memory controller 22 and the lapsed time at that time obtained from the reference timer 18 are written onto a measurement data table 61. The elapsed time at the criterion line 56 is calculated from the address of the measurement scale 56 displayed on the judged image, and data on the address and data on the elapsed time on the measured data table 61 and the elapsed time.

The principle of this process will be described in conjunction with an example of a judged image of FIG. 17, which shows an conceptual view of an image displayed on the monitor screen and synthesized from images data on which are stored in the image memory composed of the whole pixel memory 14 and compression memory 20; the marker memory 49; the time information memory 50 and the graphic memory 21.

Data on the address "1,205" of an intermittent point 59 obtained from the memory controller 22 which provides address control over the memory, data on the elapsed time "10.250" seconds at the intermittent point 59 obtained from the reference timer 18 which was started up by a race starting signal, and data on the primary scan period "1 ms" of the linear sensor when same extracted the image are stored on the measured data table 61 in the measured information memory 51.

Similarly, for the next intermittent point 60, data on its address "2,800", and data on the elapsed time "14.265" seconds are stored on the measured data table 61. A similar operation is iterated each time a moving object the image of which is to be picked up passes the judgement criterion line and the image of that moving object is picked up intermittently.

In the time measurement process, the measurement scale 56 indicative of a position displayed on the judged image of the monitor screen and where the time is to be measured is moved to a position on the judgement criterion line where the moving object 2c arrives. The address where the measurement scale 56 is displayed is also obtained from the memory controller 22 which provides address control over the memory. If this address is "850", the elapsed time involving the position of the measurement scale 56 is calculated relatively on the basis of the address "1,205" of the intermittent point 59 larger than, and closest to, the address "850" of the measurement scale 56 and the elapsed time "10.250" seconds from the next expression:

$$\begin{aligned}\text{The elapsed time} &= 10.250 \text{ seconds} - \{(\text{address } 1,205 - \text{address } 850)) \times 0.001 \text{ seconds}\} \\ &= 9.895 \text{ seconds} \approx 9.90 \text{ seconds}\end{aligned}$$

By sole movement of the measurement scale 56 from the judged image in the above system, a time lapsing since the time of start of the race when the image involving that position was extracted into the memory or a goal time is obtained. When the unit of judgement is $1/100$ seconds, the time is automatically raised to 9.90 seconds, as mentioned above; data on the result is written into the graphic memory 21 to be combined with data in the image memory and the resulting data is displayed on the monitor screen at a position of judgement display 62.

Although there is another system where the time elapsing since the start of a race is recorded along with the image in units of a linear sensor's primary scan period for each horizontal address, the amount of memory required for time recording is more than that in the earlier mentioned system. In addition, and when the image and the time data are on the same memory in the image compression, and if compressed and then expanded data does not completely coincide with the data before the compression, the time data would involve an error. Thus, non-reversible compression is undesirable. However, a reversible compression/expansion system cannot provide a high compression rate.

In the present system, the size of the measured data table 61 is only required to be for the maximum number of racers or to be for about scores of data items at most. The measured data table 61 is in the measured information memory 51 separate from the pixel memory composed of the whole pixel memory 14 and the compression memory 20. Thus, even if the compression rate of the judged image is increased to a practical limit to perform non-reversible compression on the judged image when the information in the image memory is compressed, the time data is not subjected to compression/expansion. Accordingly, the time measurement is not influenced at all.

(v) Judged Information Managing Function by a Memory Card

In order to use the order-of-arrival judging system actually, the following information is required to be managed. In order to facilitate the handling of the judging system by the user, the present system uses not general ROMs and RAMs but a well-known memory card to realize the function thereof. Examples of information to be managed and their details will be described below.

(a) System Managing Information Including Initialization, etc., for Each of Various Races System managing information for each of races is recorded on a memory card for that race. Simultaneously with the power supply for the present system being turned on, the information is transferred to the CPU of the image processor to initialize the system in accordance with that managing information. Examples of the managing information are a primary scan period optimal to the speed of movement of a moving object, the direction of movement of the object, a time measurement unit, a method and position of display of the result of the judgement, a color and its presence/absence of the judgement criterion line, the reduction/enlargement rate of the image, and an image display format.

(b) Character Information for Display of Sports Events and Record of the Race Names Characters and words used in a sports event and a race name superposed on a judged image vary from race to race. Storage of all those information is useless for the memory. In addition, since data on the number of characters stored increases, record and display are difficult. To cope with this problem, if characters/words used only for each of sports events are recorded beforehand on a memory card prepared for that sports event, the capacity of a memory used is reduced. In addition, necessary characters/words are only required to be selected from those data stored in the memory card as required to thereby facilitate record/display of the name of a sports event/race, etc.

Use of this card allows rearrangement of the characters/words to create sentences for sports events/race names, to display the sentences on the judged image, to record and hold the sentences on the card, and to read and display the sentences on the judged image. If the words or sentences are recorded in a foreign character or language on the memory card, only replacement of the card with another one leads to switching the display.

(c) Information on Management of Data on Record of the Result of the Judgement and Transfer of the Result of the Judgement to Other Information Management Devices The result of the judgement of the order-of-arrival is recordable as the judged image and data to an opto-magnetic disk unit and the judged data is transferrable from the image processor through serial communication to other information managing units. However, when none of an expensive opto-magnetic disk unit and a serial communication network can be used, the use of such memory card as a general-purpose recording medium is effective for the totalization of judged data.

The judged data obtained on the judged picture may be recorded and held in a small lightweight portable memory card, which may be connected to another information managing unit to totalize data to thereby smoothed the conduct of a race and realize an inexpensive analysis of the race.

(d) Information on a Text of a Manual for the Order-of-Arrival Judging System

Explanation for handling the system is preferably made each time the system is actually manipulated. An effective method is display of handling of only items involved in the manipulation on the monitor screen during the manipulation. To this end, it could be conceived that a system manual text is recorded as character data in a ROM or the like and displayed in the manipulation. However, when software and hence a manual are changed to improve the operability, a general ROM or the like is difficult to maintain, undesirably.

Record/management of this information on a memory card serves to solve a problem with the software change to thereby provide a system of high operability. Alternatively, an IC card having a built-in CPU may be used in place of the memory card.

(e) Logo Mark Information for a Race President or the like

If a region where a logo mark for a race president or the like is recordable is prepared in a memory card as in the manual text in response to the request that the logo mark is desired to be displayed on the judged image, figure information will be transferred to the CPU of the image processor to display the logo mark on the judged image and a change of the logo mark can be realized only by maintenance of the memory card.

If software for a general personal computer is prepared such that maintenance of the contents of the memory card for providing the above information management is made by the personal computer, the user himself can realize setting of an environment optimal to the use of the order-of-arrival judgement system which the user desires.

As described above, the present invention provides in color an image on a judgement criterion line such as a goal line. Thus, it prevents a wrong judgement on the order-of-arrival of the racers to the goal line from being made to thereby make a rapid judgement and is also applied to a color television broadcast without a sense of incompatibility.

What is claimed is:

1. An apparatus for judging the order of arrival of a moving object at a judgement criterion line such as a goal line in a race, using color image pickup, comprising:

at least one linear sensor installed on the judgement criterion line so as to align with the judgement criterion line for picking up a color image of said moving object;

an optical system for focusing the image of said moving object which passes the judgement criterion line to said at least one linear sensor;

scanning means for scanning said at least one linear sensor at a predetermined period to provide a color image signal;

means for converting said color image signal from said at least one linear sensor to image data including luminance signal data representing a luminance signal and color signal data representing a color signal;

first image memory means for storing said luminance signal data and for judging the order of arrival of said moving object at said judgement criterion line;

second image memory means for storing said color signal data and for discriminating said moving object arriving on said judgement criterion line;

writing means for writing said luminance signal data and color signal data into said first and second image memory means, respectively;

read means for selectively reading required image data at a required synchronous rate from the image data stored in said first and second image memory means;

means for converting the image data read by said read means and displaying the resulting signal; and command means for commanding the read/write of the image data from/to said first and second image memory means.

2. An apparatus according to claim 1, wherein said linear sensor comprises a color linear sensor which in turn comprises a multiplicity of opto-electric conversion elements arranged in order and repeatedly in a single row for detecting respective optical three primary colors.

3. An apparatus according to claim 1, wherein said linear sensor comprises a color linear sensor and a monochromatic linear sensor;

said optical system comprises a half mirror or spectroscopic prism for splitting light incident on said optical system to focus the image of the moving object onto said respective color and monochromatic linear sensors; and said scanning means comprises means for scanning said color and monochromatic linear sensors to provide a color and a luminance signal, respectively.

4. An apparatus according to claim 1, wherein said linear sensor comprises three linear subsensors; and said optical system comprises an optical color separating system for splitting light incident thereon into three primary color light components which focus the image of the moving objects onto said corresponding linear subsensors.

5. An apparatus according to claim 1, wherein the pixel width Ws of said linear sensor is no greater than 25.6 μm.

6. An apparatus according to claim 1, wherein a single color linear sensor is provided.

7. An apparatus according to claim 1, wherein said command means further comprises means for commanding the extraction of the whole image of the moving object into said image memory means each time the moving object passes over the judgement criterion line.

8. An apparatus according to claim 7, wherein said commanding means further comprises means for detecting the moving object directly before the moving object arrives at the judgement criterion line.

9. An apparatus according to claim 1, wherein said second image memory means has a capacity which is smaller than a capacity of said first image memory means, and said writing means comprises first writing means for writing the whole image data of the said luminance signal data into said first image memory means and second writing means for thinning out and compressing said color signal data and writing the resulting data into said second image memory means.

10. An apparatus according to claim 9, wherein said second writing means comprises means for thinning out the image data every other scan in the secondary scan direction of said scanning means.

11. An apparatus according to claim 9, wherein said second writing means comprises means for thinning out the image data every other pixel in the primary scan direction of said scanning means.

12. An apparatus according to claim 11, wherein said second writing means further comprises means for thinning out the image data every other scan in the secondary scan direction of said scanning means and for compressing image data on the color signal to its quarter in amount.

13. An apparatus for judging a race time, comprising.

at least one linear sensor installed on a judgement criterion line such as a goal line so as to align with the judgement criterion line;

an optical system for focusing the image of a moving object which passes the judgement criterion line onto said at least one linear sensor;

scanning means for scanning said at least one linear sensor at a predetermined period to provide a color image signal;

means for converting said color image signal from said at least one linear sensor to a luminance signal and a color signal and for A/D converting said signals;

first image memory means for storing image data including luminance signal data representing said luminance signal and for judging the order of arrival of said moving object at said judgement criterion line;

second image memory means for storing image data including color signal data representing said color image and for discriminating said moving object arriving on said judgement criterion line;

writing means for operating so that said respective luminance and color signal data from said converting means are written into said first and second memory means, respectively, in the vertical direction so as to coincide with the scan of said linear sensor;

read means for operating so that said respective luminance and color signal data stored in said first and second memory means are read from said first and second memory means in the horizontal direction of said memory means;

means for D/A converting the image data read by said read means and displaying the resulting signal; and command means for commanding the read/write of the image data from/to said first and second image memory means, a reference timer started up synchronously with the start of a race;

addressing means for giving addresses sequentially in each scan of said scanning means;

measuring means for extracting into a measured information memory at a required timing data on the elapsed time from said reference timer at the time of that timing and data on the current scanned address from said addressing means; and means for determining the time when any position in the image of the moving object displayed on said display means has passed the judgement criterion line on the basis of information on the scanned address of that position, information on the elapsed time read from said measured information memory and information on the scanned address.

14. An apparatus according to claim 13, wherein said time determining means comprises:

means for displaying a measuring line at any position in the image displayed on said display means in the same direction as the scan direction of said scanning means;

means for moving the measuring line to any position on a display screen of said display means; and means for determining the time when the moving object has passed over the judgement criterion line on the basis of the scanned address of the position on the display screen where the judgement criterion line is displayed.

15. An apparatus according to claim 13, wherein said measuring means comprises means for extracting into said image memory data on the scanned address and data on the elapsed time at the timing where a page of the image turns data on which is extracted into said first and second image memory means.

16. An apparatus according to claim 13, wherein said color signal outputted from said converting means is thinned out, and a capacity of said second image memory means is smaller than a capacity of said first image memory means.

17. An apparatus according to claim 13, wherein a single color linear sensor is provided.

18. An apparatus according to claim 13, wherein said command means further comprises means for commanding the extraction of data on the whole image of the moving object into said first and second image memory means each time the moving object passes over the judgement criterion line.

19. An apparatus according to claim 18, wherein said commanding means further comprises means for detecting the moving object directly before the moving object arrives at the judgement criterion line.

20. An apparatus according to claim 18, wherein said measuring means comprises means for extracting data on the scanned address and said elapsed time at a timing commanded by said commanding means.

* * * * *